(12) United States Patent
Holman (10) Patent No.: US 6,270,836 B1
(45) Date of Patent: Aug. 7, 2001

(54) GEL-COATED MICROCAPSULES

(75) Inventor: Mark E. Holman, Lewisville, NC (US)

(73) Assignee: Frisby Technologies, INc., Winston-Salem, NC (US)

( * ) Notice: Subject to any disclaimer, the term of this patent is extended or adjusted under 35 U.S.C. 154(b) by 0 days.

(21) Appl. No.: 09/484,131

(22) Filed: Jan. 14, 2000

Related U.S. Application Data (63) Continuation-in-part of application No. 09/123,090, filed on Jul. 27, 1998, now Pat. No. 6,099,894.

(51) Int. Cl.[7] ............................. C09K 3/18; C09K 19/00
(52) U.S. Cl. .................................. 427/126.3; 428/402.2; 428/402.21; 428/402.24; 428/1.6; 252/70; 252/71; 252/73; 149/14; 149/17; 149/18
(58) Field of Search ................. 427/126.3; 428/402.2, 428/402.21, 402.24, 1.6; 252/70, 71, 73; 149/14, 17, 18

(56) References Cited

U.S. PATENT DOCUMENTS

| | | | |
|---|---|---|---|
| 3,933,679 | 1/1976 | Weitzel et al. ................ | 252/301.1 |
| 4,336,338 | 6/1982 | Downs et al. ................. | 501/12 |
| 4,340,642 | 7/1982 | Netting et al. ................ | 428/402 |
| 4,349,456 | 9/1982 | Sowman ........................ | 252/317 |
| 4,459,245 | 7/1984 | Ryon et al. ................... | 264/0.5 |
| 4,618,525 | 10/1986 | Chamberlain et al. ........ | 428/209 |
| 4,748,285 | 5/1988 | Foulletier .................... | 570/169 |
| 4,964,402 | 10/1990 | Grim et al. ................... | 128/80 |
| 5,023,208 | 6/1991 | Pope et al. ................... | 501/12 |
| 5,063,179 | 11/1991 | Menashi et al. .............. | 501/12 |
| 5,405,616 | 4/1995 | Wunderlich et al. .......... | 424/451 |
| 5,433,953 | 7/1995 | Tsuei et al. .................. | 424/489 |
| 5,435,376 | 7/1995 | Hart et al. ................... | 165/10 |
| 5,476,696 | 12/1995 | Papazian et al. ............. | 428/34.4 |
| 5,492,870 | 2/1996 | Wilcox et al. ................ | 501/80 |
| 5,589,194 | 12/1996 | Tsuei ............................ | 424/497 |
| 5,670,209 | 9/1997 | Wyckoff ........................ | 427/215 |
| 5,713,974 | 2/1998 | Martin et al. ................ | 65/17.2 |

*Primary Examiner*—Nathan M. Nutter
(74) *Attorney, Agent, or Firm*—Fish & Richardson P.C.

(57) ABSTRACT

The invention relates to gel-coated microcapsules which have improved mechanical stress- and flame-resistance. A method for making the gel coated microcapsules is also provided. Phase change materials can be included in the microcapsules to provide thermal control in a wide variety of environments.

24 Claims, 1 Drawing Sheet

GEL-COATED MICROCAPSULES

This application is a continuation in part of patent application Ser. No. 09/123,090, filed Jul. 27, 1998 now U.S. Pat. No. 6,099,894, the specification of which is hereby incorporated by reference in its entirety.

FIELD OF THE INVENTION

The invention relates to microencapsulated phase change materials which are coated with a metal oxide or metalloid oxide gel.

BACKGROUND OF THE INVENTION

Phase-change materials, or "PCMs" are compositions that absorb and emit large amounts of heat by changing from one physical state to another, most often reversibly. Typical PCMs change from solid to liquid and back. Paraffinic hydrocarbons are commonly used as PCMs that melt at a desired temperature or over a desired temperature range, as disclosed, for example, in U.S. Pat. No. 5,637,389.

Phase-change materials find use or have been proposed for use in apparel for thermal management, either as discrete layers (see U.S. Pat. No. 5,499,460), as foam additives (see U.S. Pat. No. 5,637,389), as fabric coatings (see U.S. Pat. No. 5,366.801), and as additives to fibers (see U.S. Pat. No. 4,756,958). Where not used as discrete layers, PCMs may be encapsulated to minimize loss of their integrity, dissipation, or evaporation. Encapsulated PCMs are available as microcapsules ("MicroPCMs") having average diameters typically in the range of a few to a few hundred microns. MicroPCMs have been prepared for use as additives to heat exchange fluids, including motor oil (see U.S. Pat. No. 5,141,079).

PCMs which contain paraffinic hydrocarbons are typically flammable. This flammability is often an unacceptable condition. In the past, these difficulties have been overcome by either avoiding problematic physical environments, or by modification of the environments. This approach severely limits the applicability of MicroPCMs in many desirable applications. One approach to this particular problem is found in U.S. Pat. No. 5,435,376, which describes MicroPCMs which include flame resistant halogenated paraffins.

Sol-gel methods are generally covered in Sol-Gel Science—The Physics and Chemistry of Sol-Gel Processing, C. Jeffrey Brinker & Gleorge W. Scherer, 1st Ed., Academic Press, (1990), which is hereby incorporated by reference in its entirety.

The invention provides microencapsulated phase-change materials ("MicroPCMs") that have improved solvent resistance, increased hardness and reduced flammability, and methods for making them. The MicroPCMs of this invention are MicroPCMs coated with a glass-like gel material. They can be produced through sol-gel processing of MicroPCMs. The gel coating provides a degree of physical and flame protection for the microcapsules. The oxidative resistance of such particles is improved significantly, since the coating is believed to minimize oxygen contact with the microcapsules. This can result in reduced incidence of oxidation from atmospheric oxygen for the contents of the microcapsules, e.g., reduced flammability for flammable contents or reduced chemical oxidation for atmospheric oxidation sensitive contents. The contents contemplated for use in the gel-coated microcapsules include temperature stabilization materials, optical materials or magnetic materials, to name a few examples.

The invention further provides a method for providing a gel coating on MicroPCMs by a sol-gel process. This method involves creating a sol, allowing the gel reaction to take place, mixing MicroPCMs into the sol, and spraying the mixture into, or pouring the mixture onto, a collection area. Curing of the gel takes place in the collection area, and the gel-coated MicroPCMs are collected and ready for use.

The invention further provides a two-component heat transfer slurry, which can be circulated for heating or cooling purposes in a heat transport loop in which heat is transported from a heat source to a heat sink with the use of a pump.

The method of this invention has applicability beyond MicroPCMs. It can be used to coat microcapsules containing optical or magnetic materials, for example. Accordingly, this invention also includes gel-coated microcapsules containing such materials.

As used herein, a "non-released material" is a substance or mixture of substances, which interact with the environment surrounding the microcapsules primarily indirectly. Such materials are not designed to escape the microcapsule under normal operating conditions. Such materials are to be contrasted with others such as flavorings, fragrances, cosmetic products, pharmaceutical or other medical products, which are contained in microcapsules as a means of controlled release of such substances. As used herein, the term "microcapsule" means a unicellular, hollow particle, that is a particle having a peripheral wall or shell enclosing or surrounding a single, hollow cavity, space or void within the interior of the particle which, unless otherwise noted, can be evacuated or filled with a gas, liquid, or solid, such particle being so small as to require means such as an optical microscope for purposes of measuring the dimensions thereof. A microcapsule characterized herein as "spherical" is one which has the shape of a true sphere or spheroid, that is, like a sphere, e.g., oblate or prolate. A microcapsule characterized herein as "porous" is one whose wall has interconnected submicroscopic pores or passages and is permeable to liquid and/or gas, whereas an "impermeable" microcapsule is one whose wall is sealed, non-porous or closed or that has submicroscopic pores or passages so small as to minimize transmission of liquid and/or gas and to maintain the contents within the interior void of the microcapsule. The term "metal" refers to elements which are the central and ligand-bearing atoms in the gel precursors of the invention. As such, it refers not only to those elements commonly referred to as metals, but also the elements such as boron, silicon and germanium which are not traditionally considered metals. The term "potting compounds" refers to semiflexible epoxies with thixotropic and curing agents added, used to affix and cool electronic components. The term "optical material" refers to a material that undergoes physical or chemical changes upon the absorption of photons. The physical changes include the emission of light and/or heat and the reflection of light. Metastable excited states can also be formed. The chemical changes include chemical bond formation and breakage, including various rearrangements, isomerizations and the formation of metastable chemical states.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention suitable methods and materials are described below. All publications, patent applications, patents, and other references mentioned herein are incorporated by reference in their entirety. In case of conflict, the present specification including definitions, will control. In addition, the materials, methods, and examples are illustrative only and not intended to be limiting.

DETAILED DESCRIPTION OF THE INVENTION

The coated microcapsules of the invention feature microcapsules coated with a gel, specifically a gel produced by the sol-gel process. The gel coating provides certain resistances to the microcapsules, resulting in enhanced protection for their contents.

Microcapsules containing different types of materials are known, as are microencapsulation techniques to prepare such materials, which are used as starting materials in the process of this invention. Microcapsules can be used in many applications in which materials are to be contained either indefinitely or temporarily. Microcapsules have been designed to allow the slow release of pharmaceutical preparations, cosmetic products and food products such as flavoring agents. The microcapsules used in the present invention on the other hand, are adapted to contain materials that interact indirectly with the environments in which they are used.

Microcapsules are prepared according to known procedures. The material which makes up the microcapsule wall can be chosen from a wide variety of materials. The choice of materials depends primarily on the physical and chemical characteristics of the contents, and on the intended use of the microcapsules. The microcapsules should also be readily coatable with the metal oxide gel.

Preferred microcapsule wall-forming materials include various thermoplastic materials, such as natural or synthetic fatty alcohols, fatty acids, fatty esters and waxes. Natural waxes include the vegetable waxes such as carnuba, cauassu, candelilla, farria, palm, esparto, sugar cane and cotton waxes; animal waxes such as beeswax, ghedda, chinese insect, shellac, spermaceti and lanolin waxes; and mineral wax such as paraffin, microcrystalline, ozokerite, montan and syncera waxes. Synthetic and modified waxes useful as microcapsule wall-forming materials include the Carbowaxes, Abril waxes, Armid and Armowaxes (Armour & Co.) and Chlorax chlorinated paraffin wax (Watford Chemical Co.). It will be appreciated that waxes are a mixture of various components, and that each type of wax is itself available in a number of different grades.

Other thermoplastic materials are useful as microcapsule wall-forming materials, including polyethylenes such as POLYWAX® from Petrolite, Inc., polypropylenes, polyesters, polyvinyl chlorides, tristarch acetates, polyethylene oxides, polypropylene oxides, polyvinylidene chloride or fluoride, polyvinyl alcohols, polyvinyl acetates, polyacrylates, polymethacrylates, vinyl functional polymers, urethanes, polycarbonates, and polylactones. Further details on microencapsulation are found in U.S. Pat. Nos. 5,589,194 and 5,433,953.

A colloid is a suspension in which the dispersed phase is not affected by gravitational forces, due to the dimensions of the dispersed phase (1–1000 nm). A sol is a colloidal suspension of solid particles in a liquid. A gel can be considered to be the agglomeration of these particles into a structure of macroscopic dimensions, such that it extends throughout the solution. It is therefore, a substance that contains a continuous solid skeleton enclosing a continuous liquid phase.

Sol-gel processing according to this invention involves chemical processing of gel precursors to prepare a colloid. These precursors consist of metal atoms surrounded by ligands. The metal atoms and the ligands fall into wide classes.

Generally, chemical processing of the gel precursors involves hydrolysis and condensation reactions in which the ligands of the precursors are replaced by bonds to the ligands of other metal or metalloid elements. This process results in a growing network of metal or metalloid elements linked together, eventually forming a gel.

The gels for use in the invention can be prepared via reactions which use monomeric, metal oxides as gel precursors. Metal oxides for use in sol-gel processing are generally represented by $M(-OH_2)_n$ (aquo ligand), $M(-OH)_n$ (hydroxo ligand), and $M(=O)_n$ (oxo ligand), where M is the metal atom, and n depends on the coordination state of M. Metal oxides for use in such reactions include $TiO_2$, $ZrO_2$, $RuO_2$, $RuO_4$, $V_2O_5$, $WO_3$, $ThO_2$, $Fe_2O_3$, $MgO$, $Y_2O_3$, $HfO_2$, $Nb_2O_5$, $UO_2$, $BeO$, $CoO$, $NiO$, $CuO$, $ZnO$, $In_2O_3$, $Sb_2O_3$, $Al_2O_3$ and $SnO_2$. Mixtures of such oxides are also useful, such as $ZnO-TiO_2$, $TiO_2-Fe_2O_3$, $SnO_2-TiO_2$, $Nd_2O_3-TiO_2$, $Al_2O_3-Cr_2O_3$, $MgO-Al_2O_3$, $MgO-TiO_2$, $MgO-ZrO_2$, $ThO_2-UO_2$, $ThO_2-CeO_2$, $Bi_2O_3-TiO_2$, $BeO-Al_2O_3$, $TiO_2-Fe_2O_3-Al_2O_3$, $Al_2O_3-Cr_2O_3-Fe_2O_3$, $PbO-ZrO_2-TiO_2$, $ZnO-Al_2O_3-Cr_2O_3$, $Al_2O_3-Cr_2O_3-Fe_2O_3-TiO_2$, and $ThO_2-Al_2O_3-Cr_2O_3-Fe_2O_3-TiO_2$. It is also within the scope of this invention to use dispersions or sols of the ceramic metal oxides in combination or admixture with dispersions or sols of one or more metal oxides which are unstable in normal air environment (such as $Li_2O$, $Na_2O$, $K_2O$, $CaO$, $SrO$, and $BaO$) and/or ceramic oxides having an atomic number of 14 or greater (such as $SiO_2$, $As_2O_3$, and $P_2O_5$), representative combinations including $Al_2O_3-Li_2O$, $TiO_2-K_2O$, $ZrO_2-CaO$, $ZrO_2-Al_2O_3-CaO$, $ZrO_2-SrO$, $TiO_2-BaO$, $B_2O_3-SiO_2$, $TiO_2-ZrO_2-BaO$, $Al_2O_3-Na_2O$, $TiO_2-SiO_2$, $MgO-SiO_2$, $Fe_2O_3-BaO$, $ZrO_2-SiO_2$, $Al_2O_3-As_2O_3$, $ZrO_2-P_2O_5$, $Al_2O_3-SiO_2$, $A_2O_3-B_2O_3$, and $Al_2O_3-Cr_2O_3-SiO_2$.

Instead of using the precursor material in the form of dispersions or sols of the oxides, it is within the scope of the invention to use the precursor materials in the form of water soluble or dispersible inorganic or organic compounds which are calcinable to the corresponding metal oxide or metalloid oxide. These compounds representatively include many carboxylates and alcoholates, e.g., acetates, formates, oxalates, lactates, propylates, citrates, and acetylacetonates, and salts of mineral acids, e.g., bromides, chlorides, chlorates, nitrates, sulfates, and phosphates, selection of the particular precursor compound being dictated by availability and ease of handling. Representative precursor compounds useful in this invention include ferric chloride or nitrate, chromium chloride, cobalt nitrate, nickel chloride, copper nitrate, zinc chloride or carbonate, lithium propylate, sodium carbonate or oxalate, potassium chloride, beryllium chloride, magnesium acetate, calcium lactate, strontium nitrate, barium acetate, yttrium bromide, zirconium acetate, hafnium oxychloride, vanadium chloride, ammonium tungstate, aluminum chloride, indium iodide, titanium acetylacetonate, stannic sulfate, lead formate, antimony chloride, bismuth nitrate, neodymium chloride, phosphoric acid, cerium nitrate, uranium nitrate, and thorium nitrate.

The sol-gels for use in the invention can also be prepared via reactions which use monomeric, metal alkoxide precursors. This class of compounds is represented by $M(OR)_n$, where M is a metal, OR is an alkoxide (an alkoxide with from one to six carbons which may be further substituted), and n is from 2 to 8, depending on the coordination state of the metal. The metals used in the metal alkoxide precursors are Ti, Cr, W, Th, Fe, Mg, Y, Zr, Hf, V, Nb, U, Be, Co, Ni, Cu, Zn, In, Sb, Al, Sn and Si. The alkoxy ligands are generally alkoxides with from one to six carbons such as methoxy, ethoxy, propoxy, butoxy, pentoxy, and hexoxy ligands, or substituted or unsubstituted aryloxy groups. Oligomeric precursors can be used such as ethoxypolysiloxane (ethyl polysilicate), hexamethoxydisiloxane ($Si_2(OCH_3)_6$) and octamethoxytrisilioxane ($Si_3(OCH_3)_8$).

The monomeric, tetrafunctional alkoxysilane precursors are represented by the following formula.

where RO is a $C_1$–$C_6$ substituted or unsubstituted alkoxy group, or a substituted or unsubstituted aryloxy group. Typical examples include methoxy, ethoxy, n-propoxy, n-butoxy, 2-methoxyethoxy, and phenylphenioxy groups. Ethoxypolysiloxane (ethyl polysilicate), hexamethoxydisiloxane ($Si_2(OCH_3)_6$) and octamethoxytrisilioxane ($Si_3(OCH_3)8$) can also be used, as well as the cubic octamer ($Si_8O_{12})(OCH_3)_8$. Organically modified silicates having various organic ligands can be used, such as those formed by combining tetraalkoxysilanes with alkyl-or aryl-substituted and organofunctional alkoxysilanes. Organic functionality can be introduced to the alkoxy ligands with substituents such as $—(CH_2)_{n1}NH_2$, $—(CH_2)_{n1}NHCO\text{-}O\text{-}NH_2$, $—(CH_2)_{n1}S(CH_2)_{n2}CHO$, and like substituents, where n1 and n2 are from 0 to 6. Polymerizible ligands can also be employed, such as epoxides, to form organic networks in addition to an inorganic network. Choice of precursor can be made according to solubility or thermal stability of the ligands.

To produce gels with somewhat less dense structure, to impart more organic character to the gel, or to allow for derivitization, organotrialkoxysilanes ($R'Si(OR)_3$) or diorganodialkoxysilanes ($R'_2Si(OR)_2$) can be used as gel precursors. The groups R' need not be the same as each other on a given precursor molecule. Examples of such precursors are methyltriethoxysilane, methyltrimethoxysilane, methyltri-n-propoxysilane, phenyltriethoxysilane, and vinyltriethoxysilane.

Catalysts are optionally but generally present in sol-gel processing. Acids and bases are suitable catalysts for sol-gel processing as carried out in the invention. Such catalysts facilitate both hydrolysis and condensation reactions, and can play a role in product structures. Preferred catalysts include inorganic acids (e.g., hydrochloric, nitric, sulfuric and hydrofluoric acid), amines including ammonia and ammonium hydroxide, organic acids (e.g., acetic acid), bases (e.g., potassium hydroxide), potassium fluoride, metal alkoxides (e.g., titanium alkoxide, vanadium alkoxide). All other factors being equal, acid catalysis produces gels which are cross-linked to a lesser extent than gels produced by base catalysis. A suitable catalyst for the sol-gel processing reactions of the invention is nitric acid.

Sol-gel processing can also take place in the presence of solvents. Suitable solvents include water, alcohols (e.g., methanol, ethanol), amides (e.g., formamide, dimethylformamide), ketones (e.g., acetone), nitriles (e.g., acetonitrile), and aliphatic or alicyclic ethers (e.g., diethyl ether, tetrahydrofuran, or dioxane). These solvents can facilitate hydrolysis reactions as described below, especially if the ligands present on the sol-gel precursor molecules are bulky, such as phenylphenoxy ligands.

Inasmuch as water is often a reactant involved in sol-gel processing reactions, as in the hydrolysis reaction described below, it is included in the list of solvents to the extent that water in excess of a stoichiometric minimum amount is provided. Solvents other than water are generally employed to prevent phase separation in those sol-gel processing reactions which involve water-immiscible components. Control over the concentration of the reactants is also provided through the use of a solvent.

The first reaction generally taking place is hydrolysis, in which the alkoxide ligands of the alkoxysilanes are replaced by hydroxide ligands, from water. This reaction is represented here.

where RO is a $C_1$–$C_6$ substituted or unsubstituted alkoxy group, or substituted or unsubstituted aryloxy group. The product of this reaction is an alcohol, reducing the need for alcohol or other mutual solvents as the reaction proceeds. Since the reaction is reversible, the alcohol can also participate in reverse reactions, reesterification and transesterification. All substituents attached to silicon are labile, and populations of substituents will depend in an equilibrium sense on control exerted over the concentrations of alcohol and water, the type of catalyst used and the extent of reaction.

Under acid-catalysed hydrolysis conditions, the alkoxide ligand is likely to be protonated as a first step, making it a better leaving group as water attacks from the backside of the central silicon atom. Seemingly for this reason, steric effects of the ligands play a significant role in determining the rate of this reaction. Under base-catalysed hydrolysis, dissociation of water to produce hydroxide ion likely takes place. The hydroxide attacks the backside of the central silicon atom, displacing the alkoxide ion. Inductive effects of the ligands are likely to be important here since the silicon atom develops charge in the transition state.

The subsequent condensation reactions can either be between Si-OR and Si-OH or between two molecules of Si-OH to produce a silicate gel as shown in the following reactions.

The mechanism of silicate gel formation is distinct from that of organic polymers, in that the silicic acid ($Si(OH)_4$)

polymerizes into discrete particles. These particles then aggregate into chains and networks. The resulting macroscopic structure of the gel can be characterized as either a dense network with well-defined solid-liquid interfaces, a uniformly porous network, or an open network.

This gel is then desirably dried to eventually produce a glassy material. Dried gels are referred to as xerogels or aerogels. Xerogels are produced by evaporation of liquid, while aerogels are dried by supercritical extraction of solvent. During this phase of the process, consolidation of the gel occurs.

The gel initially tends to shrink as liquid is removed, through removal of liquid at the surface of the gel. The amount of shrinkage that occurs initially is dependent both on how the gel is produced and how it is dried. Drying by evaporation of solvent produces xerogels which are denser than aerogels produced by supercritical extraction of liquid.

At pH values below about 2, hydrolysis reactions involve protonated alkoxide groups and the rate of hydrolysis is large compared to the rate of condensation. The supply of precursor monomers is essentially depleted at an early point in the condensation reaction. Resulting cluster-cluster aggregation leads to weakly branched structures. Above pH of about 7, hydroxide and $SiO^-$ ions are the reactive species in hydrolysis and condensation reactions, respectively. If at least stoichiometric ratios of water to gel precursor are used ($[H_2O]/[Si].4$), more compact and highly branched structures result as described in Brinker et al. *Sol-Gel Science*, Chapter 3.

Thus, gels produced through acid-catalysis are cross-linked to a lesser extent. Such gels shrink more during initial drying because the structures can interpenetrate each other more. The pores in such a gel are smaller, so that capillary pressure which is exerted during final stages of drying further compacts the structure. The resulting gel is characterized by an extremely fine texture. The pores in gels produced by acid-catalysis and drying by evaporation range in size from 10 to 50 Å.

According to the invention, gel coatings of metal oxides or metalloid oxides are produced on the surface of microcapsules. The gel coatings must completely surround the microcapsules, providing isolation from the external environment. Thus, the coating must be a continuous coating.

For applications in which the gel-coated microcapsules are used to encapsulate flammable materials, the coating should be thick enough on average to significantly inhibit the diffusion of atmospheric oxygen into the interior of the microcapsules, thus preventing combustion. For applications in which the sol-gel coated microcapsules are expected to maintain their integrity under mechanical stress, the coating must be thick enough on average to withstand a certain amount of mechanical stress without breaking. The acceptable amount of mechanical stress will vary depending on the application. According to preferred embodiments of the invention, the integrity of the microcapsules is maintained. For applications in which heat must be transferred through the gel coating to the interior, the coating must not be so thick on average so as to inhibit the conduction of heat. For applications in which light must be efficiently transferred to or from the microcapsule interior from or to the outside, the coating must allow sufficiently efficient transmission at the wavelength of light appropriate for such applications. These applications will rely both on the coating thickness and the absorption and reflectivity of light at various wavelengths. For applications in which magnetic fields are to extend through the microcapsules, the coating must allow the passage of such fields without significant losses. These considerations lead to practicable gel coating thicknesses of from 0.5 to 7.0 microns.

Microcapsules suitable for the present invention may contain a wide variety of materials. The choice of materials is limited only by the conditions for processing of the gel-coated microcapsules of the invention. Suitable materials include phase change materials, magnetic materials, and optical materials. The microcapsules of the present invention are designed to contain materials that interact with the surrounding environment indirectly, rather than being released from the microcapsule. For example, the microcapsules can comprise MicroPCMs which absorb or emit heat from or to the environment. In another embodiment, optical materials contained in the microcapsules of the invention can absorb or emit light from or to the environment. Other materials include magnetic materials which interact with the environment without direct contact with the environment.

Phase change materials are well suited for inclusion in microcapsules. These materials will absorb or emit heat at a constant temperature (their phase change temperature) before changing phase. Thus, the material can be used as an absorber of heat to protect an object from additional heat as a quantity of thermal energy will be absorbed by the phase change material before its temperature can rise. The phase change material can also be preheated and used as a barrier to cold, as a larger quantity of heat must be removed from the phase change material before its temperature can begin to drop.

Heat transfer across the microcapsule material into its interior can be efficient. Coated microcapsules must retain the ability to transfer significant heat to and from the phase change materials if the microcapsules are to effectively function as temperature stabilizers. Gel-coated microcapsules containing phase change materials are useful for incorporation into foams, fibers, heat transfer slurries, coatings, thermal greases, potting compounds and many other applications. Potting compounds are described in U.S. Pat. No. 5,224,356.

Examples of phase change materials are paraffinic hydrocarbons, namely normal (straight-chain) hydrocarbons represented by the formula $C_nH_{2n+2}$, wherein n can range from 10 to 30. Preferred paraffinic hydrocarbons are those in which n ranges from 13 to 28. Other compounds which are suitable for phase change materials are 2,2-dimethyl-1,3-propanediol (DMP), 2-hydroxymethyl-2-methyl-1,3-propanediol (HMP) and similar compounds. Also useful are fatty esters such as methyl palmitate. Preferred phase change materials are paraffinic hydrocarbons.

Optical materials include those which can absorb, emit, reflect or refract light. The light can be visible, ultraviolet or infrared light. Light emitting materials include fluorescent or phosphorescent materials. Light absorbing materials include those with electronic absorption bands in the visible, ultraviolet and infrared regions of the spectrum. These materials can be useful for monitoring purposes, and can find applications in harsh chemical environments, since the sol-gel coating provides physical insulation from such environments which would otherwise render the materials inoperable. The sol-gel coated microcapsules are small enough to be used to monitor flow conditions in harsh environments without disrupting flow themselves, for example.

Magnetic materials can also be used inside the gel-coated microcapsules of the present invention, and can be used for monitoring of magnetic fields in harsh environments which would otherwise render the materials inoperable.

Microcapsules suitable for the present invention have diameters ranging from 1.0 to 2,000 microns. Preferably, the microcapsules have diameters of from 5 to 500 microns. Most preferably, the microcapsules have diameters of from 10 to 200 microns.

Methods of Making Gel-coated Microcapsules

The invention also provides a method for producing gel-coated microcapsules, by the method of sol-gel processing. In general, microcapsules as described above containing any of the materials mentioned herein are mixed with a sol.

Sols are generally prepared by mixing metal-containing gel precursor and solvent together in a precursor/solvent ratio which can vary from about 3:1 to about 5:1 by volume. Preferably, the precursor/solvent ratio varies from about 3.5:1 to about 4.2:1. Separately, catalyst and water were mixed in a catalyst/water ratio which can vary from about 1:12 to about 1:22 by volume. The two solutions are mixed together with stirring. As the mixture warms and cools, the onset and completion of reaction is indicated, at which time microcapsules are added to the mixture and mixing continued. The pH of this mixture can range from about 1.0 to about 2.0, preferably the pH of the mixture is from about 1.1 to about 1.4.

The mixture is then immediately passed through an aperture (e.g., a spray nozzle) with pressure in order to atomize the mixture. An airless spray system can also be used, in which air is not a propellant, but rather the system pressurizes a container of sol mixture. This requires somewhat smaller batches, and a larger collection chamber to prevent the sprayed gel-coated microcapsules from sheeting out on the chamber walls.

An internal mix spray gun can be used, if the concentration of the microcapsules in the sol is increased by approximately 20% or more above that described above. The greater viscosity of the microcapsule sol can also allow the use of a pressure feed gun. Bleed-type guns are not preferred since the air flowing through the gun can cause the sol to cure inside the gun.

The atomized mixture may be directed into one of several types of areas. One of these types of areas is a collection and curing chamber. The preferred collection chamber size for a batch process is at least three feet in diameter by 12 feet long. It is possible to use larger collection chambers to allow larger batches to be run and to reduce the chance of product loss through sheeting on the chamber walls. However, product recovery becomes more difficult as the product is dispersed over larger areas. It is recommended that the chamber be cleared of product after each batch is run. This will prevent new microcapsule-containing sol from attaching to product remaining from previous runs, thereby minimizing the amount of unacceptably large particles. The chamber walls can be lined with polypropylene, polymethyl propylene, or Teflon to prevent product from permanently adhering to the walls.

The chamber can optionally have a gas passing through it. This passage of a gas through the collection and curing chamber acts to suspend the sol-gel coated microcapsules, permit and maintain separation of microcapsules from one another if this is a desirable result, evaporate residual surface alcohol and/or water, and begin the curing process. Flow rates of the mixture into the chamber and gas through the chamber may be adjusted to allow complete evaporation of residual alcohol and/or water.

In many applications, the gel-coated microcapsules are preferably substantially isolated from each other during gel curing, with little agglomeration of microcapsules. Flow rates of the mixture into the chamber may be adjusted to control the amount of substantially isolated gel-coated microcapsules. Chamber input spray rates and rates of sol-gel curing can be adjusted so that microcapsules can be found in an agglomerated state. Generally, pressures of less than 20 psig will tend to promote agglomeration of particles. Pressures of more than 50 psig will tend to minimize agglomeration. In these cases, the gel-coated microcapsule agglomerates will have greater average coating thicknesses and therefore increase flame resistance. If an airless spray system is employed, the pressures recited above are somewhat less.

Curing of the gel coating should be substantially completed before the coated microcapsules settle to the floor of the chamber for collection. The flowing gas may be air, oxygen, nitrogen, argon, or any other gas, although it must be noted that oxygen will often form explosive mixtures with the sol mixtures of the invention, so extreme caution should be used in the case of oxygen. The choice of gas depends on the particular requirements of the sol coating used. In some instances the gas will be chemically inert toward the coated microcapsules. In other cases, the gas may be used to chemically react with the gel coating. The gas may be warmed in order to facilitate evaporation of alcohol and curing of the coating layer. The gas may also be cooled to slow the solvent evaporation and/or sol-gel curing process.

A continuous process collection chamber (e.g., with a forced air system, vortex design and/or conveyor belt) can be much smaller than that used for batch operations.

As another variation, the sol solution and microcapsules are mixed together as above and poured onto a surface. The surface can be flat or have any desired texture. The surface can be any suitable non-reactive surface, for example a metallic surface such as stainless steel, a polymeric surface, or a surface coated with Teflon or a like material. The pouring operation results in a film. The thickness of the film will depend on the viscosity of the sol/microcapsule mixture. The surface can also be heated or cooled depending on the desired curing rate.

Upon curing, the poured mixture generally cracks into flakes of varying sizes. The flakes generally contain a plurality of microcapsules. In this way the microcapsules are effectively surrounded by a thicker sol-gel coating. Increased chemical and flame resistance can be achieved for the microcapsules in this way. The cured flakes can be subsequently reduced to smaller crystals by a variety of processes, including pulverization, sonication, and tumbling. The gel-coating process can also be repeated to make a microcapsule with several layers of gel-coating. Thus, as starting material for the coating process, microcapsules or gel-coated microcapsules can be used. Variations in the sol can thereby result in coatings of different types on the microcapsules.

Thermal Control Materials

The gel-coated microPCMs of the invention can be used to make flame-resistant, and mechanical stress-resistant thermal control materials. Examples of such materials include flame-resistant foams, fibers, slurries, coatings, greases and potting compounds. These materials generally act as a thermal barrier between heat sources and heat sinks.

In each case, the materials are characterized by the presence of a base material, which encapsulates the gel-coated MicroPCMs of the invention and has embedded within it a plurality of the gel-coated MicroPCMs of the invention. Preferably, the microcapsules are individually surroundingly encapsulated and embedded within the base material, and substantially all the microcapsules are spaced apart from one another with base material in the space between the neighboring adjacent microcapsules.

In some embodiments, the gel-coated MicroPCMs of the invention are incorporated into foams which serve as base material. These foams can be useful in environments in which flame-resistance coupled with thermal control is desirable. Incorporation of the foams into clothing used by fire fighters is envisioned, for example. These foams can also be useful in environments in which thermal control and mechanical stress-resistance is desirable, such as in foot wear, for example. In these embodiments, the base material is a foam, chosen from any class of foam, including open cell and closed cell foams. Of each type, either hydrophilic or hydrophobic foams could be utilized. These foams are made by methods familiar to those skilled in the art. The foams are generally provided with a plurality of gel-coated MicroPCMs. In general, MicroPCMs are added to the foam resin prior to manufacturing the foam. But they may also be added using adhesives, coatings, or by physically pressing them into the foam material.

In other embodiments, the gel-coated MicroPCMs of the invention are incorporated into fibers. These fibers can be formed into a fabric by conventional weaving, knitting, or non-woven methods. In fabricating the fiber, the desired gel-coated MicroPCMs are added to the liquid polymer, polymer solution, or other base material and the fiber is then expanded according to conventional methods such as dry or wet spinning of polymer solutions and extrusion of polymer melts. Again, gel-coated MicroPCMs can be applied to fabrics using adhesives or coatings. Further details on the production and uses of such fibers and fabrics are found in U.S. Pat. No. 4,756,958.

In fabricating the fiber, the desired microencapsulated phase change materials are added to the liquid polymer, polymer solution, or base material and the fiber is expanded according to conventional methods such as dry or wet spinning of polymer solutions and extrusion of polymer melts. Embedding the microcapsules directly within the fiber adds durability as the phase change material is protected by a dual wall, the first being the wall of the microcapsule and the second being the surrounding fiber itself. Thus, the phase change material is less likely to leak from the fiber during its liquid phase, thus enhancing its life and repeatability of thermal response.

In another important aspect of the invention, a fabric can be formed from the fibers described above by conventional weaving, knitting or nonwoven methods. For example, in a woven fabric any combination of the warp and weft with or without microcapsules can be used in order to obtain the desired texture and durability. This fabric may then be used to fabricate temperature adaptable clothing and other thermal barriers. For example, protective gloves can be made from the fabric. This concept can be applied to numerous applications including shoes, environmental suits as well as other applications which require shielding of individuals or machinery from the hot and cold.

In other embodiments, the gel-coated MicroPCMs of the invention can be used in slurries utilized in heat transfer applications. These applications can make use of the mechanical stress-resistance of the gel-coated MicroPCMs of the invention. These slurries can be used to enhance heat transfer in circulating heat pumps, as described in U.S. Pat. No. 4,911,232.

These heat pumps can be made part of pumped thermal control systems such as residential and commercial building heating and cooling systems, automotive heating and cooling systems, solar-powered heating systems, industrial process temperature control systems, computer and electronics cooling systems, and personal comfort systems such as microclimate heating and cooling systems.

The slurry containing gel-coated MicroPCMs is made up of a carrier fluid, and the MicroPCMs as described above. The carrier fluid can be almost any fluid depending on the system requirements under which it must operate. Factors that influence the selection of a particular carrier fluid included temperature, toxicity, viscosity, pressure, etc. However, it will be noted that for the majority of applications, water or any one of a variety of lubricating oils well known to those skilled in the art could be employed. Lubricating oils are often used instead of water to prevent corrosion of the workpiece material in most cases. Preferred carrier fluids include water, hydrocarbon oils, and silicone oils. Other preferred fluids include halogenated hydrocarbons, including chlorotrifluoroethylene (CTFE), also known as 1-chloro-1,1,2-trifluoroethylene, and available as Kel-F (San Diego Plastics, San Diego). Also useful are poly α-olefins. Mixtures of these fluids are also useful as carrier fluids, such as a mixture of poly α-olefin to halogenated hydrocarbon of from about 1:1 to about 10:1 in weight percent.

The particular embodiment which makes up a heat transfer slurry is useful for obtaining enhanced thermal energy transfer between a thermal energy source and a thermal energy sink in a closed loop thermodynamic system, for example. A two component heat transfer slurry as described above comprising a plurality of gel-coated MicroPCMs is circulated in a close proximity to a thermal energy source, so that heat is deposited from the thermal energy source to the heat transfer fluid. The MicroPCMs undergo a reversible latent energy transition upon transfer of thermal energy to the fluid. The closed loop system allows circulation of the fluid to close proximity to a thermal heat sink, where the heat stored in the MicroPCMs is deposited to the thermal energy sink. The closed loop system is generally tuned to a minimum change in the temperature between the thermal energy source and thermal energy sink in order to maximize the heat transport. The flow rate is reduced until the overall heat transfer coefficient Cp is maximized according to the formula $C_p = Q/m \, \Delta T$, where Q is heat input, m is the mass flow rate, and $\Delta T$ is $T_{out} - T_{in}$. This will maximize the efficiency of heat transfer systems which utilize phase change materials. In cases in which the thermal energy source temperature is fixed, the tuning can involve adjusting the thermal energy sink temperature. Conversely, when the thermal energy sink temperature is fixed, the tuning can involve adjusting the thermal energy source temperature. This procedure is carried out according to methods known to those skilled in the art, as described in U.S. Pat. No. 4,911,232.

First, with the heat source off, the slurry flow rate is adjusted into the laminar flow region. Those skilled in the art will be able to accomplish the foregoing for a first approximation of laminar flow.

Next, the flow rate of the cooling water flowing in the heat sink is adjusted to produce an outlet temperature that is below the freezing temperature of the phase change material. For example, for a system transferring heat in the 50 Watt range, a cooling temperature below the phase change material freezing point has been found to work well.

The heat source is then turned on and the system is allowed to approach steady state operation.

While observing $T_1$ (the slurry temperature entering the heater) and $T_3$ (the slurry temperature entering the rejection heat exchanger or thermal energy sink), the cooling flow rate is adjusted so as to cause $dT = T_3 - T_1$ to decrease to a minimum value. This step constitutes a coarse tuning of the system.

Next, the system is fine tuned by carefully adjusting the slurry flow rate to further minimize dT.

In another embodiment, the gel-coated MicroPCMs of the invention can be used in coatings of all types, including paints, gels, and a variety of other coatings. The coatings can include materials such as ABS, SAN, acetal, acrylic, alkyd, allyl, amino, cellulosic, epoxy, fluoroplastics, liquid-crystal polymers, nylon, phenolic, polyamide, polyimide, polycarbonate, polyester, polyetherketone, polyetherimide, polyolefin, polyphenylene ether, polyphenylene sulfide, polystyrene, polyurethane, polyvinyl chloride, sulfone polymers, laminated plastics, nitrile rubber, butyl rubber, viton, mylar, thermoplastic elastomers, thermoplastic rubbers, ethylene vinyl acetate, polyureas, Kevlar, aramide, aromatic polyamides, fluorinated hydrocarbons, silicone and parylene.

The gel-coated MicroPCMs of the invention can also be used without being incorporated into a base material. And example of such an application is given in U.S. Pat. No. 5,415,222.

The gel-coated MicroPCMs of the invention can also be incorporated into products to be heated by microwave energy sources. Such products include serving trays and food containers, including those used in airline food services, as well as in hot food delivery containers, such as those used by pizza delivery persons, for example. Drink containers can also contain the gel-coated MicroPCMs of the invention, such as cups, pitchers and carafes which can be heated by microwave energy sources. Medical products such as elastic bandages, ankle, wrist, knee or elbow supports and wraps, bed liners, and products for easing the pain of those suffering from arthritis and other joint afflictions can also include the gel-coated MicroPCMs of the invention. Apparel such as boots, boot liners, gloves, and glove liners can include the gel-coated MicroPCMs of the invention and thereby be heatable by microwave energy sources, as well as can protective equipment such as knee pads, braces, shin protectors and safety helmets. Cookware including ovens, crock pots and frying pans can also include the gel-coated MicroPCMs of the invention and be heated by microwave energy sources. Other products such as car seat cushions, bicycle seat pads, and pillows are also suitable for inclusion of the inventive materials.

The gel-coated microcapsules can also be included in injection molded products made from polymeric materials such as thermoplastic elastomers. Such products include medical braces, prosthetics, and other medical devices, and furniture products such as seat backs, seat bottoms, and armrests, and protective equipment such as knee pads, braces, shin protectors, and helmets, for example. The thermoplastic elastomers include polymers and both random and block copolymers, including, for example products made from styrene polymers and block copolymers, polyoxyalkylene materials, acrylic polymers, methacrylate polymers and copolymers.

The invention will be further described in the following examples, which do not limit the scope of the invention described in the claims.

EXAMPLES

The following examples illustrate certain embodiments of the gel-coated microcapsules, their properties, and methods of their production.

Example 1

Preparation of MicroPCM Sol

An example preparation of a particular gel-coated microcapsule, one containing phase change material (a MicroPCM) was carried out as follows. These procedures require handling materials that are hazardous to human health. Suitable protective equipment was worn and appropriate precautions were taken to prevent the inhalation of MicroPCM dust, and particular care was taken to avoid the inhalation or skin contact with nitric acid and tetraethyl orthosilicate. No open flames were allowed in the vicinity during the procedure. It should be noted that hazardous volatile compounds can remain in the collection chamber for several hours after a production run.

The reactions were carried out in a fume hood with a filter for volatile organic compounds. The operator wore protective clothing, latex gloves, protective goggles and a respirator for dust and volatile organic compounds. All transfers were done by pipette. 16.5 mL of 95% ethanol and 63 mL of 98% tetraethyl orthosilicate (TEOS) were added to a 150 ml, polypropylene or polymethyl propylene container, and mixed well. In a separate container, 20.4 mL of deionized water and 1.62 g of nitric acid were mixed. The acidic solution was added to the TEOS solution and stirred with a Teflon-coated stirring stick for 30 minutes. The mixture was observed to become warm and then cool as the reaction was completed. Upon completion of reaction, 26.3 g of M-111 MicroPCM powder (docosane-based MicroPCM of $50\mu$ diameter with $1\mu$ shell thickness, phase change temperature of 111° F., Frisby Technologies, Inc.) was added to the fully reacted sol, and the contents mixed.

Example 2

Gel Coating Procedure

A double action, siphon fed non-bleeder style spray gun with external mix was adjusted with 30 psig air pressure from a 3 cfm tank style air compressor outfitted with an air filter and a pressure regulator. The spray was adjusted to produce a fan pattern approximately 1 inch wide by 6 inches high measured one foot from the spray head.

A spray collection chamber was set up. The chamber has a minimum diameter of four feet and was vented to an organic filter. Before use, all chamber access holes are sealed, except the spray port.

The operator wore protective gloves, goggles, respirator and clothing. The MicroPCM sol was poured into the cup of a spray gun. The spray gun nozzle was inserted in to the collection chamber spray port and spraying was commenced. Care was taken to avoid spraying the walls of the chamber. When the spray gun was emptied, a stream of air continued to be sprayed through the gun for several minutes to help purge the chamber of volatile compounds. The spray gun was removed and the spray port closed. The gun and its parts were cleaned thoroughly with alcohol to prevent solidification of the sol inside the gun. The coated particles were allowed to settle for 4–5 hours, at which time the chamber was opened and the product collected. Mechanical removal of the product from the chamber wall was accomplished by brushing with a soft brush, lint-free cloth or a soft plastic or rubber scraper. Alternatively, the product was removed by washing the chamber with water, and filtering the wash water with a $5\mu$ or smaller filter which removes 90% of the product.

Example 3

Testing by Flame

Flame testing was performed on foam samples containing MicroPCMs according to Federal Method 5903 (Vertical Flame Test) in a Govmark VC-2 vertical flame test chamber. The MicroPCM foam to be tested was mounted in the Govmark VC-2 and exposed to an open flame for 12 seconds. After removing the flame, the afterflame (the flame remaining after the initial flame was removed) was timed. Samples which supported an afterflame of more than two seconds failed the flame test. Samples which supported afterflames of two seconds or less passed the flame test.

Preliminary testing on open cell silicon foam (Magnafoam Technology, Inc., Ontario Canada) containing gel-coated M-111 MicroPCMs indicated that the gel provides twice the flame resistance of uncoated MicroPCMs (twice the number of samples passed the test). MicroPCMs which have been twice-coated provided six times the flame resistance of uncoated MicroPCMs (six times as many samples passed the test).

Example 4

Heating by Microwave Sources

Figure 1:
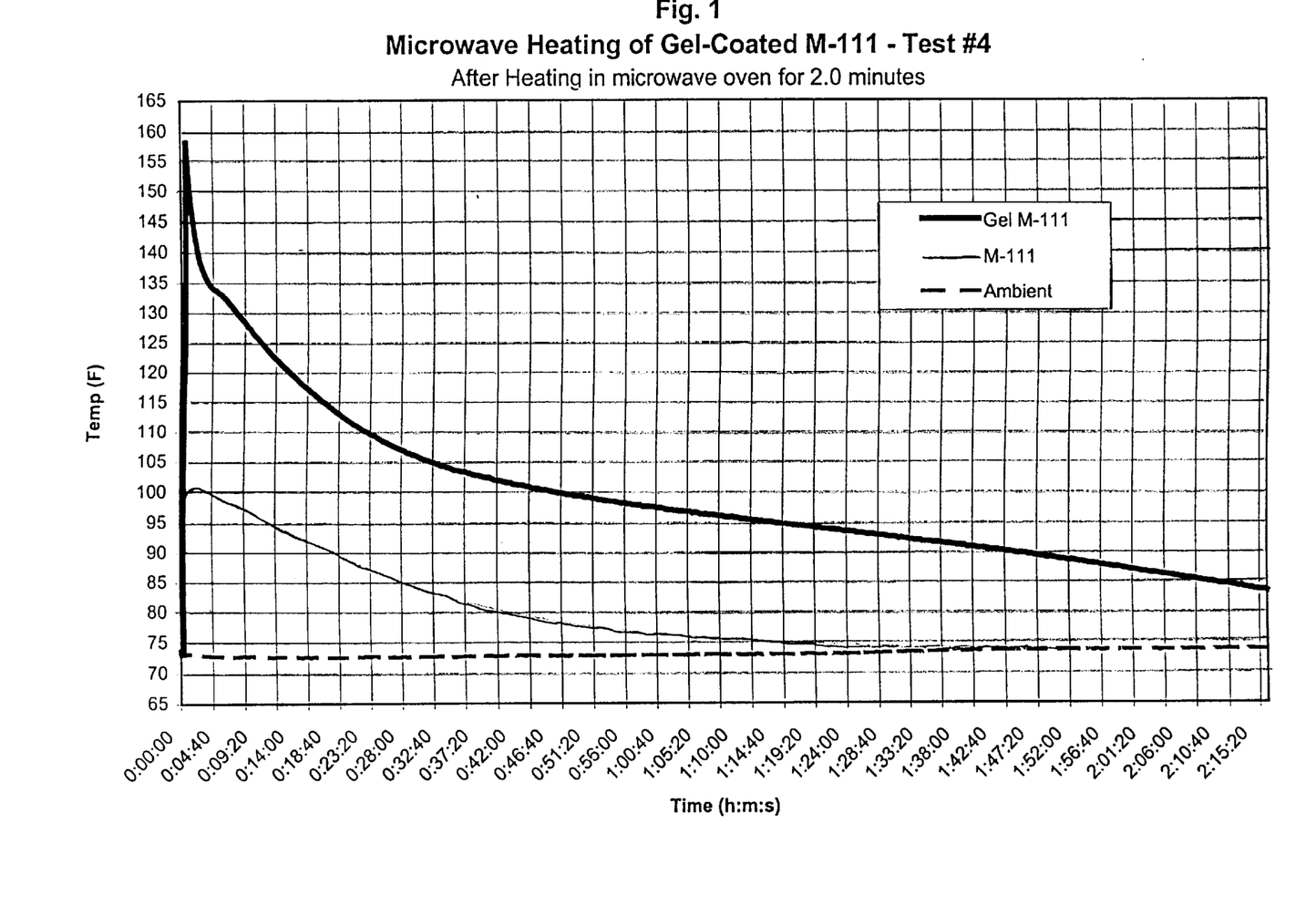
FIG. 1 shows a temperature vs. time plot of gel-coated microcapsules containing a phase change material according to a particular embodiment of the invention, uncoated microcapsules containing phase change material, after heating for two minutes with a microwave oven.

The gel coated MicroPCM of the invention can be effectively heated by microwave sources. FIG. 1 shows the temperature vs. time curves for uncoated and gel-coated MicroPCM, each type of capsule containing paraffin hydrocarbon phase change material with a melting point of approximately 111° F. (docosane). M-111 is available from Frisby Technologies, Inc. (Winston-Salem, N.C.). The ambient room temperature was also recorded. 50 garms of the coated material was prepared according to the procedures described in Examples 1 and 2, and heated in a glass container. A standard microwave oven was used on its only setting, and heating was carried out for two minutes.

The data clearly show the rapid heating and long heat retention of the gel-coated MicroPCM according to the invention, as compared to uncoated MicroPCM of the same type. The inventive material maintained its heat well above ambient for over two hours.

Other Embodiments

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. Thermal control material comprising:
   a base material; and
   a plurality of gel-coated microcapsules within the base material wherein the microcapsules comprise a phase-change material encapsulated in a polymeric shell, including a continuous metal oxide gel coating.

2. The thermal control material of claim 1, wherein the average size of the microcapsules is less than 50 microns.

3. The thermal control material of claim 1, wherein the phase-change material is flammable, and the microcapsules are flame-resistant.

4. The thermal control material of claim 3, wherein the phase-change material is selected from the group consisting of paraffinic hydrocarbons, propane diols, and fatty esters.

5. The thermal control material of claim 4, wherein the phase-change material is at least one paraffinic hydrocarbon.

6. The thermal control material of claim 1, wherein the continuous metal oxide gel coating comprises a silicon oxide gel.

7. The thermal control material of claim 1, wherein the thermal control material has insulative properties for use as a thermal barrier when placed between a heat source and a heat sink.

8. The thermal control material of claim 1, wherein the gel-coated microcapsules are embedded within and dispersed throughout the base material.

9. The thermal control material of claim 1, wherein the base material is a foamed organic polymer.

10. The thermal control material of claim 9, wherein the foamed organic polymer is selected from the group consisting of open and closed cell hydrophobic foams, and open and closed cell hydrophilic foams.

11. The thermal control material of claim 10, wherein the foamed organic material is incorporated into an article of clothing or footwear.

12. The thermal control material of claim 11, wherein the article of clothing or footwear is used in fire fighting.

13. The thermal control material of claim 1, wherein the base material comprises fiber.

14. The thermal control material of claim 13, wherein said fiber is formed into a fabric.

15. The thermal control material of claim 1 in the form of a potting compound, wherein the base material comprises epoxy, thixotropic agents and curing agents.

16. The thermal control material of claim 1, wherein the base material comprises paint or gel coating.

17. A method of imparting flame-resistant temperature stabilization to microcapsules in a foam, the method comprising:
   providing a foam of the type having a base material with a plurality of gel-coated microcapsules in a manner so that the microcapsules are embedded within the base material, wherein the microcapsules comprise a phase-change material encapsulated in a polymeric shell, including a continuous metal oxide gel coating.

18. A heat transfer fluid comprising:
   the gel-coated microcapsules wherein the microcapsules comprise a phase-change material encapsulated in a polymeric shell, including a continuous metal oxide gel coating, and
   a carrier fluid.

19. A method of obtaining enhanced thermal energy transfer between a thermal energy source and a thermal energy sink in a closed loop thermodynamic system, the method comprising:
   a) circulating a two component heat transfer fluid in a close proximity to the thermal energy source, the heat transfer fluid of claim 17 that undergo a reversible latent energy transition upon transfer of thermal energy to the fluid so that thermal energy is transferred thereto;
   b) circulating the heat transfer fluid in proximity to a thermal energy sink so that thermal energy is removed therefrom;
   c) tuning the closed loop thermodynamic system to maximize the latent heat transport.

20. The heat transfer fluid of claim 18, wherein the heat transfer fluid is incorporated into a pumped thermal control system selected from the group consisting of residential and commercial building heating and cooling systems, automotive heating and cooling systems, solar-powered heating systems, industrial process temperature control systems, computer and electronics cooling systems, personal comfort systems, and microclimate heating and cooling systems.

21. A microwavable article comprising the thermal control material of claim 1.

22. A method of heating a thermal control material, said method comprising:
   a) providing a base material with a plurality of gel-coated microcapsules, wherein the microcapsules comprise a phase-change material encapsulated in a polymeric shell, including a continuous metal oxide gel coating; and
   b) exposing the thermal control material to a microwave source for time sufficient to cause heating of said thermal control material.

23. An molded article comprising the thermal control material of claim 1 and a thermoplastic elastomer.

24. The molded article of claim 23, wherein the article is an injection molded article.

* * * * *